Dec. 7, 1954  H. H. F. AHRENS  2,696,155

HEATING AND VENTILATING SYSTEM FOR MOTOR COACHES

Filed Aug. 30, 1950

Inventor
Hermann Heinrich Friedrich Ahrens
By Hicke and Padlon
Attorneys

United States Patent Office 2,696,155
Patented Dec. 7, 1954

2,696,155

HEATING AND VENTILATING SYSTEM FOR MOTOR COACHES

Hermann H. F. Ahrens, Sindelfingen, Wurttemberg, Germany, assignor to Daimler-Benz Aktiengesellschaft, Stuttgart-Unterturkheim, Germany Application August 30, 1950, Serial No. 182,299

Claims priority, application Germany September 3, 1949

6 Claims. (Cl. 98—10)

My invention relates to a heating and ventilating system for motor coaches and other large vehicles, such as buses, streetcars, etc.

It is the object of my invention to eliminate certain deficiencies inherent in prior art systems such as a faulty distribution of the air in the interior of the vehicles, drafts annoying the passengers, and excessive local heat at some places within the vehicle caused, for instance, by heating elements arranged beneath the seats.

It is another object of my invention to substantially simplify the heating system thus reducing the cost of manufacture thereof.

More particularly, my invention relates to heating and ventilating systems in which structural elements of the vehicle of a hollow cross-section, such as box-shaped weight-carrying beams, are made use of to supply and distribute the heated air, or the fresh air respectively. According to the present invention the inner longitudinal bottom sills or beams of the vehicle body constitute ducts for the admission of heating air and fresh air into the vehicle, whereas the longitudinal roof-beams serve the purpose of supplying fresh air only to the interior of the vehicle, the air so admitted being evenly distributed to all parts of the passenger compartment through openings provided in the walls of the sills or beams and distributed over the entire length thereof, settable means controlling such openings being provided, such as flaps or valves, to modify the distribution of the air at the option of the individual passengers. The stale air is preferably removed through windows equipped with swingable window panes located in the side walls or in the roof or through suction pipes or the like. Further details of my invention will appear from the description of a preferred embodiment thereof following hereinafter with reference to the accompanying drawings in which Fig. 1 is a side elevation of a bus body provided with an illustrative form of the novel heating and ventilating system;

Figure 1:
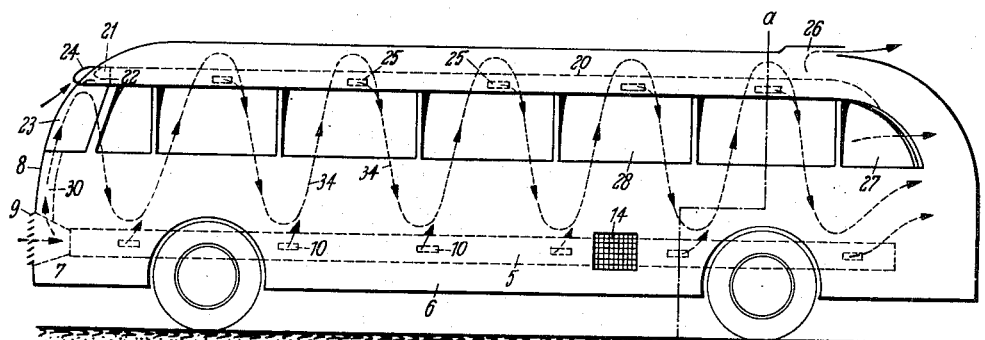

According to the present invention, the inner longitudinal bottom sills or beams 5 of the body 6 are used as a conduit to supply heating air and fresh air to the interior of the body. For this purpose, I have taken the following steps: I use hollow box-shaped members having a closed cross-sectional profile for the bottom sills 5 and at their front ends I provide the same with funnels 7 opening forwardly thus permitting the outside air to flow into the bottom sills 5 under the effect of the air pressure existing in front of the vehicle. The admission of fresh air may be controlled by shutters 9 mounted so as to cover the front openings 7 of the sills 5, such shutters, if closed, shutting off the fresh air supply entirely. The inner walls of the sills 5 are provided with openings 10 distributed over the entire length thereof and adapted to admit the fresh air into the interior 11 of the vehicle body. By differentially dimensioning either the width of the openings or their distance or both I may attain a perfectly uniform distribution of the fresh air admitted through the openings over the entire interior space of the vehicle.

The two bottom sills 5 communicate with one another through a transverse duct 12 provided in the rear half section of the vehicle. This transverse duct is extended beyond one of the sills 5 up to an opening 14 provided in the side wall 13 of the body, such opening 14 being covered by a grid. Within duct 12 between the side wall 13 and the sill 5 adjacent thereto there are mounted a heat exchanging device 15 and a fan 16, the latter being preferably driven by an electric motor and adapted to feed fresh outside air sucked in through opening 14 through the heat exchanging device 15 and into the sills 5, whence the heated air is blown into the passenger compartment 11. If desired, the shutters 9 may be opened for the purpose of admixing cold outside air to the heated air. The operation of the heat exchanging device 15 may be performed by electrical energy, or by combustion of liquid fuels or by the hot exhaust gases of the vehicle engine or by any other suitable means. The heat exchanging device may be mounted at any desired point of the longitudinal sills, for instance near the front end thereof, if that appears desirable in view of the particular circumstances surrounding the case.

Figure 2:
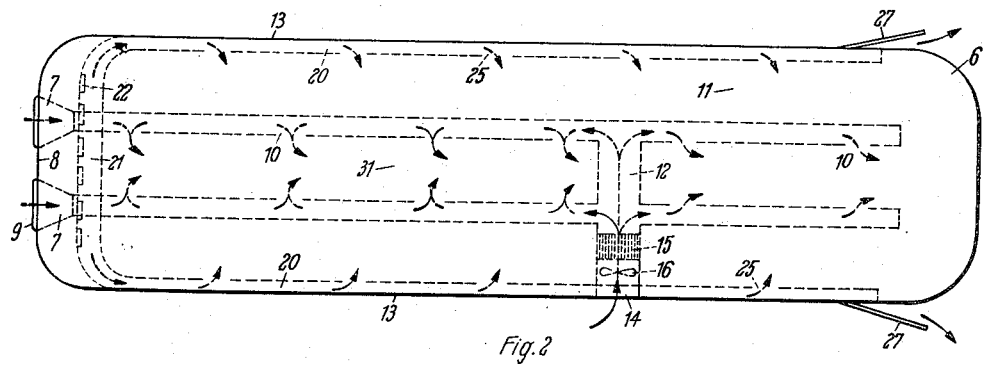
Fig. 2 is a top plan view of the body of the vehicle.
Figure 3:
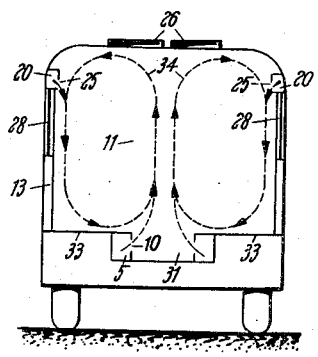
Fig. 3 is a cross-section taken along the line a—a looking rearwardly.
Figure 4:
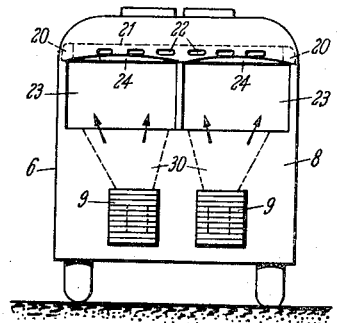
Fig. 4 is a front view of the vehicle.

According to another feature of the present invention the longitudinal roof-beams 20 of hollow box-like structure having a closed cross-section are likewise used as a conduit for the conduction of fresh air and for the admission thereof to the interior of the vehicle. Both roof-beams communicate with a transverse front roof-beam 21 which is likewise formed by a hollow member, the transition from the beam 20 to the beam 21 being smooth without abrupt changes of cross-section. The front of beam 21 is provided with apertures 22 located behind slots 24 which are formed by a skirt-shaped member to intercept the air flowing over the wind-shield 23 upwardly as indicated by the arrow at the left upper corner of Fig. 1. The air current entering through the slots 24 provided in the outer skin of the vehicle flows through the opening 22 and the transverse beam 21 into the two longitudinal roof-beams 20 and thence through apertures 25 provided in the inner walls of beams 20 into the entire inner space of the body. The size of the apertures 25 and their distance may be so chosen that the air will be uniformly distributed over the length of the vehicle and the apertures may be provided with flaps or shutters permitting of any desired individual control. The discharge of the stale air is effected by a suction vent 26 provided in the roof of the vehicle near the rear end thereof and through windows 27 provided in the side walls of the body near the rear ends thereof and adapted to be closed by window panes arranged to have their rear edges swung outwardly, as shown in Fig. 2.

The funnel-shaped forward extensions 7 of the longitudinal sills communicate with vertical ducts 30 extending to points near the lower edges of the wind-shield windows whereby an air current may be blown along such windows in order to keep the same clear. In cold weather the shutters are entirely or almost entirely closed so that the air which has been heated by the heat exchange device 15 passes forward through ducts 10 and up through ducts 30 and serves to de-frost the windshield.

The aforedescribed features result in the following novel effect characteristic of the present invention:

When the system is used during summer time for ventilating the interior of the vehicle, a comparatively large number of little air jets of a low and adjustable speed distributed over the entire space either uniformly or to meet the requirements will enter through the apertures 10 and 25 and through the ducts 30 combining to constitute a fresh air column flowing within the vehicle from the front to the rear, such moving column being equally distributed over the entire cross-section of the interior of the vehicle, the air being discharged therefrom at the rear end of the vehicle. Owing to that effect, local draft as would be caused for instance by lowered side windows or lateral ventilation flaps and the like is eliminated and, nevertheless, a very efficient ventilation of the passenger's space will be attained.

When the system is used in cold weather to ventilate and heat the interior of the vehicle, the current conditions will be as follows: a large number of little jets of heated fresh air uniformly distributed over the length of the vehicle will issue from the apertures 10 and will enter the central aisle 31 of the body ascending from there to the ceiling as indicated by the arrows 34 in Fig. 1. Along the side walls 13 of the body an equal number of jets of cool fresh air will issue from the apertures 25 of the longitudinal roof-beams and will descend towards the floor 33 of the body thus creating two spirals of air in the interior of the body moving slowly from the front to the rear, the hot fresh air mixing in such spirals with the cool air thus uniformly heating and ventilating the interior without local drafts and local over heating.

With respect to the physiological effect of the present invention it is material that the hot air entering near the bottom of the vehicle will keep the passengers' feet warm while the cool fresh air entering near the roof will keep the passengers' heads and bodies at a comfortable cooler temperature, particularly inasmuch as the hot air flowing through the sills 5 will also by heat convection heat the bottom 33 on which the passengers' feet are resting, such bottom being rigidly connected with the sills 5. Owing to the issue of the hot air first into the central aisle 31 in which normally no passengers are standing during the travel, there is no objection to adjusting the temperature of the hot air to a rather high degree, if necessary, since no passengers will be made uncomfortable by the hot air jets.

The fresh air entering through the apertures 25 has a lower humidity than the average humidity prevailing within the vehicle and, in descending along the side walls of the body, will be heated to a higher temperature by contact with the other air. Therefore, the jets of fresh air descending from the apertures 25 will tend to keep the side windows 28 clear which in the absence of such fresh air jets would be covered with moisture because of the higher humidity of the other air caused by the exhalation of the passengers and by the condensation ensuing therefrom upon contact of the relatively warm air with the cold windows.

When the vehicle is at rest and, therefore, no pressure acts against the front wall 8, the ventilator 16 may be preferably operated to feed air into the vehicle through the sills 5 and the apertures 10 and the heat exchange device 15 may or may not be put in operation to heat the air.

Having now described a preferred embodiment of my invention I wish it to be clearly understood that the same is in no way limited to the details thereof but is capable of numerous modifications within the scope of the appended claims.

What I claim is:

1. A heating and ventilating system for coaches comprising in combination hollow floor sills extending longitudinally of the motor coach at a distance from the side walls thereof, hollow roof beams extending along the side walls of said coach, apertures being provided in said sills and said beams spaced along said sills and beams and opening into the interior of said coach, means for feeding outside air to said beams, two separate means being provided for admitting outside air into said sills, one of said separate means including a fan for forcing the outside air into said sills.

2. The combination set forth in claim 1 in which said coach has a front wall provided with lower openings and the one of said separate means for feeding outside air to said sills comprises funnel-shaped front ends on said sills communicating with said openings.

3. The combination set forth in claim 1 in which said coach has a front wall provided with upper openings and in which said means for feeding outside air to said roof beams comprise a hollow transverse roof member forming part of the body of said coach and communicating with the front ends of said roof beams and with said upper openings.

4. The combination set forth in claim 1 in which said coach has a front wall provided with a wind shield window and with slots in said wall located above said window and facing downwardly to intercept the upward wind current passing across said window and in which said means to feed outside air to said roof beams comprise a hollow transverse roof member forming part of the body of said coach and communicating with the front ends of said roof beams and with said slots.

5. The combination set forth in claim 1 in which the floor of said coach has a central depressed portion extending between said floor sills beneath said apertures, the latter being provided in the opposed side walls of said sills.

6. A heating and ventilating system for motor coaches having two side walls, at least one of the same being provided with an air intake opening, said system comprising in combination at least two transversely spaced hollow floor sills extending longitudinally of the motor coach at a distance inwardly from said side walls, a transverse duct communicating with said hollow floor sills and with said opening, a fan in said duct and arranged to feed air therethrough from said intake opening into said sills, heating means in said duct, and a floor section between said sills lower than the upper edges of said sills to run longitudinally and centrally of the coach, the sides of said sills which face each other being provided with apertures located above said floor section and distributed over the length of said coach, whereby said floor sills serve as conduits for distributing at various points in said coach the air fed to said sills.

References Cited in the file of this patent

UNITED STATES PATENTS

| Number | Name | Date |
|---|---|---|
| 106,771 | Bestor | Aug. 30, 1870 |
| 383,247 | Plumb | May 22, 1888 |
| 1,440,781 | Josephs, Jr. et al. | Jan. 2, 1923 |
| 2,112,101 | Kliesrath | Mar. 22, 1938 |
| 2,134,724 | McClanahan et al. | Nov. 1, 1938 |
| 2,151,865 | Nallinger | Mar. 28, 1939 |
| 2,165,559 | Lintern | July 11, 1939 |
| 2,320,596 | Henney | June 1, 1943 |
| 2,347,141 | Werdehoff | Apr. 18, 1944 |
| 2,382,712 | Hans | Aug. 14, 1945 |
| 2,391,408 | Galamb et al. | Dec. 25, 1945 |
| 2,526,560 | Hans | Oct. 17, 1950 |

FOREIGN PATENTS

| Number | Country | Date |
|---|---|---|
| 444,205 | Great Britain | Mar. 17, 1936 |
| 588,457 | Great Britain | May 22, 1947 |